(12) United States Patent
Kato

(10) Patent No.: US 8,981,282 B2
(45) Date of Patent: Mar. 17, 2015

(54) DISPLACEMENT DETECTING DEVICE, DISPLACEMENT DETECTING METHOD, AND COMPUTER-READABLE MEDIUM

(71) Applicant: Mitutoyo Corporation, Kawasaki-shi, Kanagawa (JP)

(72) Inventor: Yoshiaki Kato, Kawasaki (JP)

(73) Assignee: Mitutoyo Corporation, Kawasaki-Shi (JP)

(*) Notice: Subject to any disclaimer, the term of this patent is extended or adjusted under 35 U.S.C. 154(b) by 350 days.

(21) Appl. No.: 13/660,436

(22) Filed: Oct. 25, 2012

(65) Prior Publication Data
US 2013/0105675 A1   May 2, 2013

(30) Foreign Application Priority Data

Oct. 28, 2011   (JP) .................................. 2011-237894

(51) Int. Cl.
*G01D 5/34*    (2006.01)
*G01D 5/38*    (2006.01)

(52) U.S. Cl.
CPC ....................................... *G01D 5/38* (2013.01)
USPC ..................................................... 250/231.13

(58) Field of Classification Search
CPC .... G01D 5/3473; G01D 5/26; G01D 5/34746
USPC ................ 250/231.13–231.19, 237 R, 237 G, 250/559.29; 341/9–14
See application file for complete search history.

(56) References Cited

U.S. PATENT DOCUMENTS

| 2010/0057392 A1* | 3/2010 | York ................................ 702/94 |
| 2010/0217384 A1* | 8/2010 | Liddicoat et al. ............ 623/2.11 |
| 2012/0153135 A1* | 6/2012 | Ishizuka .................. 250/231.18 |
| 2012/0205528 A1* | 8/2012 | Augustyniak et al. ... 250/231.13 |

FOREIGN PATENT DOCUMENTS

| EP | 2295940 | 3/2011 |
| JP | 2004-347465 | 12/2004 |
| WO | 2007/092402 | 8/2007 |
| WO | 2008/020231 | 2/2008 |

OTHER PUBLICATIONS

Extended European Search Report dated Feb. 10, 2014, 9 pages.

* cited by examiner

*Primary Examiner* — Seung C Sohn
(74) *Attorney, Agent, or Firm* — Rankin, Hill & Clark LLP

(57) ABSTRACT

A photoelectric encoder includes a light-emitting element, a scale, a lens, a PDA, and a signal processing circuit. The signal processing circuit includes a distortion table, a distortion compensation circuit, and a position analyzing circuit. The distortion table is calculated in advance on the basis of pieces of distortion information that were obtained by a distortion simulation using design values of the optical system such as the lens. The distortion compensation circuit corrects a light/dark signal of the PDA by eliminating distortion caused by the optical system by changing the positions of the respective PDs of the PDA virtually on the basis of the distortion table and the pieces of position information of the respective PDs. The position analyzing circuit analyzes a position of the scale on the basis of the corrected light/dark signal.

9 Claims, 13 Drawing Sheets

DISTORTION REFERENCE POSITION

DISPLACEMENT DETECTING DEVICE, DISPLACEMENT DETECTING METHOD, AND COMPUTER-READABLE MEDIUM

CROSS-REFERENCE TO RELATED APPLICATION(S)

The present application claims the benefit of priority of Japanese Patent Application No. 2011-237894, filed on Oct. 28, 2011. The disclosures of this application are incorporated herein by reference.

BACKGROUND

1. Technical Field

The present invention relates to a displacement detecting device, a displacement detecting method, and a computer-readable medium which are applied to incremental-type or absolute-type linear or rotary encoder etc. capable of position measurement.

2. Related Art

Photoelectric encoders are known as optical displacement detecting devices which performs a position measurement by reading a pattern on a scale (refer to Patent document 1, for example). The photoelectric encoder of Patent document 1 has a three grating structure in which incident light coming from a light source is input to light-receiving elements via three optical gratings and one of the three optical grating is movable relative to the other two optical gratings.

For example, one of the three optical gratings or, instead, a light-receiving element array is configured in such a manner that its grating pitch or arrangement pitch varies gradually in the relative movement direction according to a pitch variation of a projected interference fringe, that is, the grating pitch or arrangement pitch increases as the distance from the light source increases. With this measure, a light/dark signal corresponding to a scale pattern is prevented from being distorted due to aberrations of an optical system such as a lens and degradation of position information is thus suppressed. Even a portion, far from the light source, of an interference fringe can be handled as a light/dark signal without producing a DC component, whereby the signal detection efficient is increased.

PRIOR ART DOCUMENTS

Patent Documents

[Patent document 1] JP-A-2004-347465

However, in the configuration of Patent document 1, the arrangement pitches of the light-receiving element array and other items need to be designed for each distortion pattern caused by an optical system such as a lens, which means the cost for increasing the accuracy of detection of scale position information is very high.

SUMMARY

One or more exemplary embodiments of the present invention provide a displacement detecting device, a displacement detecting method, and a computer-readable medium which can increase the accuracy of detection of scale position information by canceling out distortion caused by an optical system at a low cost.

A displacement detecting device according to an exemplary embodiment comprises:

a scale having a scale pattern with a certain arrangement pitch;

an optical system configured to form an optical image of the scale pattern;

a light-receiving element array having a plurality of light-receiving elements which is configured so as to be movable relative to the scale and which is configured to detect the image of the scale pattern and to output a light/dark signal obtained from the scale pattern image;

a distortion compensation circuit configured to correct the light/dark signal which is output from the light-receiving element array by eliminating distortion caused by the optical system by changing positions of the respective light-receiving elements virtually on the basis of pieces of position information of the respective light-receiving elements and a distortion table obtained from distortion information of the optical system; and a position analyzing circuit configured to analyze a position of the scale using the corrected light/dark signal.

With this configuration, correct position information of the scale can be obtained by eliminating distortion caused by the optical system from a light/dark signal corresponding to the scale pattern without the need for changing the positions of the respective light-receiving elements of the light-receiving element array physically. This makes it possible to increase the accuracy of detection of scale position information at a low cost.

The distortion table may be calculated in advance on the basis of distortion information that is obtained by a distortion simulation using design values of the optical system.

The displacement detecting device may further comprise:

a distortion detecting circuit configured to detect deviations $\Delta p_k$ of virtual intervals between light-receiving elements that correspond to the detected scale pattern image from intervals between the light-receiving elements on the basis of the pieces of position information of the respective light-receiving elements and the light/dark signal which is output from the light-receiving element array, and to generate a distortion table on the basis of pieces of distortion information $\Delta e_i$ each of which is obtained by adding up the detected deviations $\Delta p_k$.

The displacement detecting device may further comprise:

distortion detecting circuit configured to extract a partial light/dark signal corresponding to a prescribed region $R_i$ centered by each PD located at a position $x_i$ and calculate a phase $\phi_i$ of the partial light/dark signal corresponding to each prescribed region $R_i$ with the use of a light-receiving element origin $O_{PDA}$ on the basis of the pieces of position information of the respective light-receiving elements and the light/dark signal which is output from the light-receiving element array, to calculate each piece of distortion information $\Delta e_i$ by calculating a difference between each calculated phase $\phi_i$ and a phase $\phi_a$ of a partial light/dark signal corresponding to a prescribed region $R_a$ centered by a distortion-less light-receiving element located at a distortion reference position $x_a$, and to generate a distortion table on the basis of the calculated pieces of distortion information $\Delta e_i$.

The scale may have scale patterns formed on a plurality of tracks;

the optical system and the light-receiving element array may have a plurality of optical systems and a plurality of light-receiving elements corresponding to the plurality of tracks; and the distortion compensation circuit may be configured to correct light/dark signals corresponding to the plurality of tracks using a distortion table in which pieces of distortion information of optical systems corresponding to the other tracks are modified so as to become equal to distortion information of an optical system corresponding to one of the plurality of tracks.

The distortion compensation circuit may be configured to correct the light/dark signals using a distortion table which is generated on the basis of differences between the distortion of the optical system corresponding to the one track and the pieces of distortion information of the optical systems corresponding to the other tracks.

The displacement detecting device may further comprise: a storage unit configured to store the distortion table.

A displacement detecting method, according to an exemplary embodiment, of a displacement detecting device having a scale having a scale pattern with a certain arrangement pitch, an optical system configured to form an optical image of the scale pattern, a light-receiving element array having a plurality of light-receiving elements which is configured so as to be movable relative to the scale and which is configured to detect the image of the scale pattern and to output a light/dark signal obtained from the scale pattern image, a distortion compensation circuit configured to correct the light/dark signal which is output from the light-receiving element array, and a position analyzing circuit configured to analyze a position of the scale on the basis of the corrected light/dark signal, the method comprises:

acquiring a light/dark signal by detecting an image of the scale pattern;

correcting the acquired light/dark signal by eliminating distortion caused by the optical system by changing positions of the respective light-receiving elements virtually on the basis of pieces of position information of the respective light-receiving elements and a distortion table obtained from distortion information of the optical system; and analyzing a position of the scale on the basis of the corrected light/dark signal.

A non-transitory computer-readable medium, according to an exemplary embodiment, storing a program that causes a computer to execute displacement detection, the computer controlling a displacement detecting device having a scale having a scale pattern with a certain arrangement pitch, an optical system configured to form an optical image of the scale pattern, a light-receiving element array having a plurality of light-receiving elements which is configured so as to be movable relative to the scale and which is configured to detect the image of the scale pattern and to output a light/dark signal obtained from the scale pattern image, a distortion compensation circuit configured to correct the light/dark signal which is output from the light-receiving element array, and a position analyzing configured to analyze a position of the scale on the basis of the corrected light/dark signal, the displacement detection comprises:

acquiring a light/dark signal by detecting an image of the scale pattern;

correcting the acquired light/dark signal by eliminating distortion caused by the optical system by changing positions of the respective light-receiving elements virtually on the basis of pieces of position information of the respective light-receiving elements and a distortion table obtained from distortion information of the optical system; and analyzing a position of the scale on the basis of the corrected light/dark signal.

According to the exemplary embodiments of the present invention, it is possible to increase the accuracy of detection of scale position information by canceling out distortion caused by an optical system at a low cost.

DETAILED DESCRIPTION

Displacement detecting devices, displacement detecting methods, and displacement detecting programs stored in a computer-readable medium according to embodiments of the present invention will be hereinafter described in detail with reference to the accompanying drawings.

Embodiment 1

Figure 1:
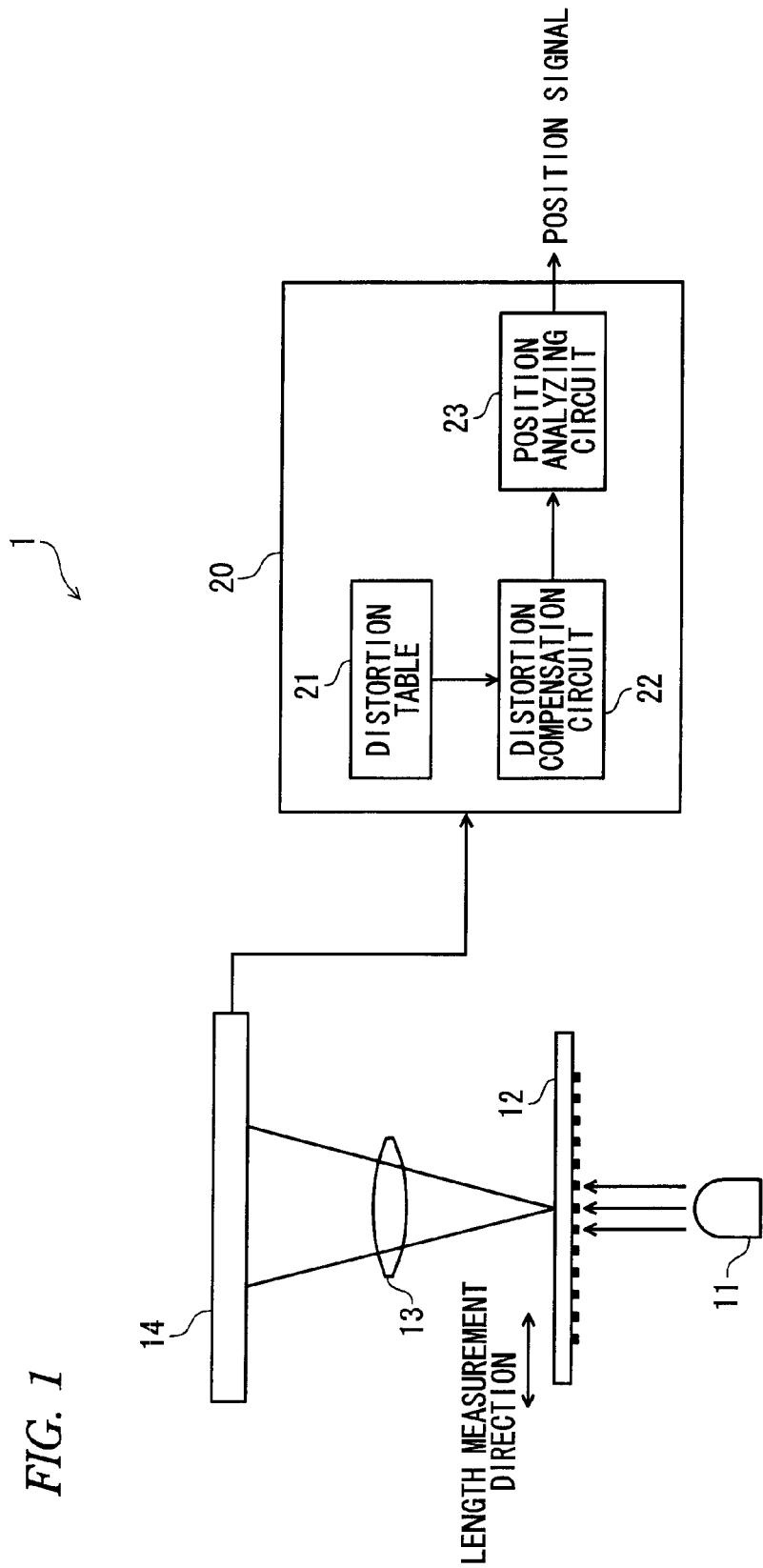
FIG. 1 is an outline view showing the overall configuration of a photoelectric encoder which is a displacement detecting device according to a first embodiment of the invention.

FIG. 1 is an outline view showing the overall configuration of a photoelectric encoder 1 which is a displacement detecting device according to a first embodiment of the invention. The photoelectric encoder according to the first embodiment includes a light-emitting element 11, a scale 12, a lens 13, a photodiode array (light-receiving element array; hereinafter abbreviated as PDA) 14, and a signal processing circuit 20.

Figure 2:
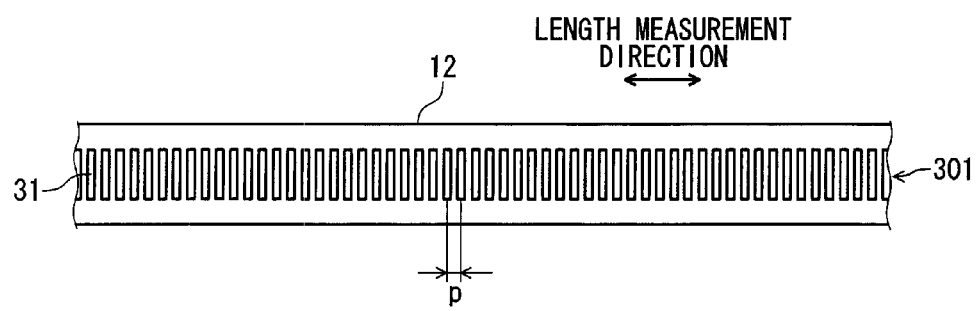
FIG. 2 is a plan view for description of a configuration of a scale in FIG. 1.

The light-emitting element 11 is an LED, for example. As shown in FIG. 2, the scale 12 is configured in such a manner that an incremental track (hereinafter referred to as an INC track) 301 having a light/dark incremental pattern (hereinafter referred to as an INC pattern) 31 having a constant arrangement pitch p (e.g., 40 μm) is formed on a transparent glass substrate, for example.

The light-emitting element 11 illuminates the scale 12, and illumination light that passes through the scale 12 is projected onto the PDA 14 through the lens 13. As a result, an image of the INC pattern 31 of the INC track 301 is formed on the PDA 14 and a light/dark signal is obtained from the image of the INC pattern 31.

Figure 3:
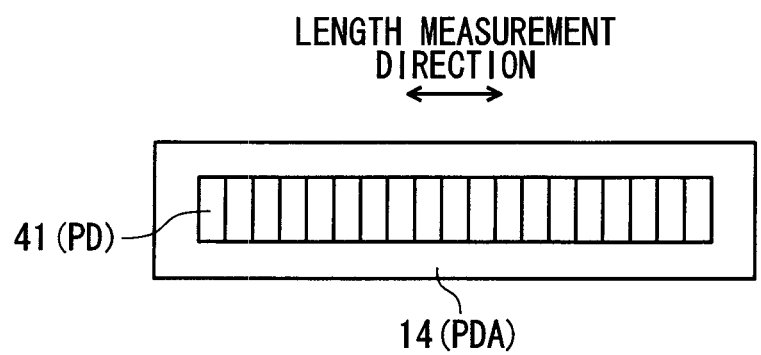
FIG. 3 is a plan view for description of a configuration of a photodiode array in FIG. 1.

As shown in FIG. 3, the PDA 14 has plural photodiodes (hereinafter abbreviated as PDs) 41 which are arranged so as to correspond to the INC track 301. For example, the PDA 14 has four sets of PDs 41 which are different from each other in phase by 90°, and the PDA 14 detects a light/dark signal corresponding to the INC pattern 31 and outputs 4-phase sinusoidal signals having phase differences of 90°.

Figure 4:
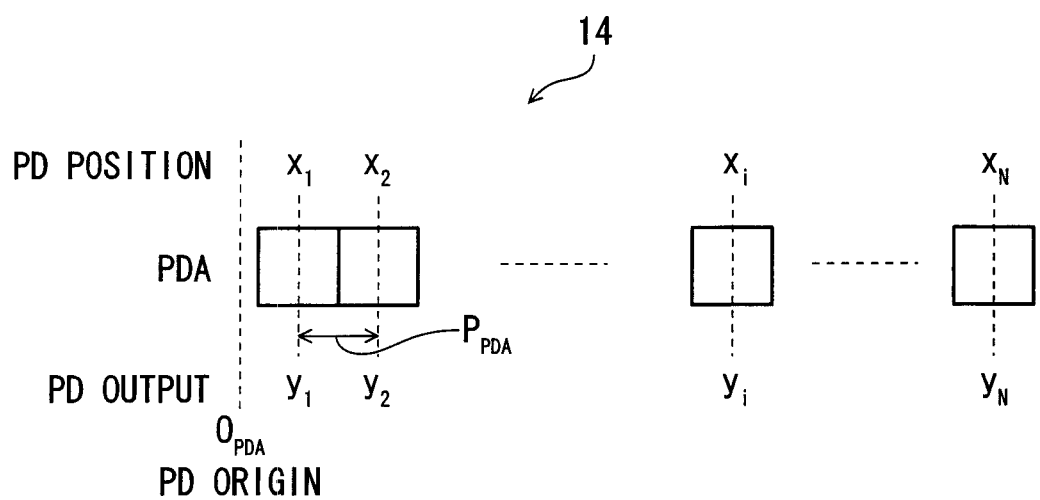
FIG. 4 is a plan view for description of a configuration of the photodiode array in FIG. 1.

As shown in FIG. 4, the PDA 14 consists of plural (n=1, 2, . . . , N) PDs 41 which are arranged at a length-measurement-direction pitch $P_{PDA}$. The position of an ith PD 41 of the PDA 14 with respect to a PD origin $O_{PDA}$ which is set at an arbitrary position in the PDA 14 is represented by $x_i$, and the output of the ith PD 41 is represented by $y_i$.

For example, the signal processing circuit 20 includes a noise filter, amplification circuit, an A/D converter, and a relative position detecting circuit, etc. (none of which are shown). For example, the signal processing circuit 20 also includes a distortion table 21 calculated in advance on the basis of pieces of distortion information $\Delta e_i$ that were obtained by a distortion simulation using design values of the optical system such as the lens 13. The distortion table 21 is stored in a storage unit (not shown) provided in the signal processing circuit 20, and is read into a distortion compensation circuit 22 and referred to when necessary.

The signal processing circuit 20 also includes the distortion compensation circuit 22, and a position analyzing circuit 23. The distortion compensation circuit 22 corrects a light/dark signal of the PDA 14 by eliminating distortion caused by the optical system by changing the positions of the respective PDs 41 of the PDA 14 virtually on the basis of the distortion table 21 and the pieces of position information of the respective PDs 41. The position analyzing circuit 23 analyzes a position of the scale 12 on the basis of the corrected light/dark signal.

For example, the noise filter eliminates noise from analog output signals (4-phase signals having 90° phase differences) of the PDs 41. The amplification circuit amplifies the noise-eliminated signals and outputs resulting signals. The A/D converters convert the amplified analog output signals into digital signals. The relative position detecting circuit generates 2-phase signals having a 90° phase difference from the thus-obtained digital signals (4-phase signals having 90° phase differences) and performs an arctangent operation etc. on them, and thereby outputs a signal which indicates a relative movement length and a relative movement direction of the scale 12.

Figure 5:
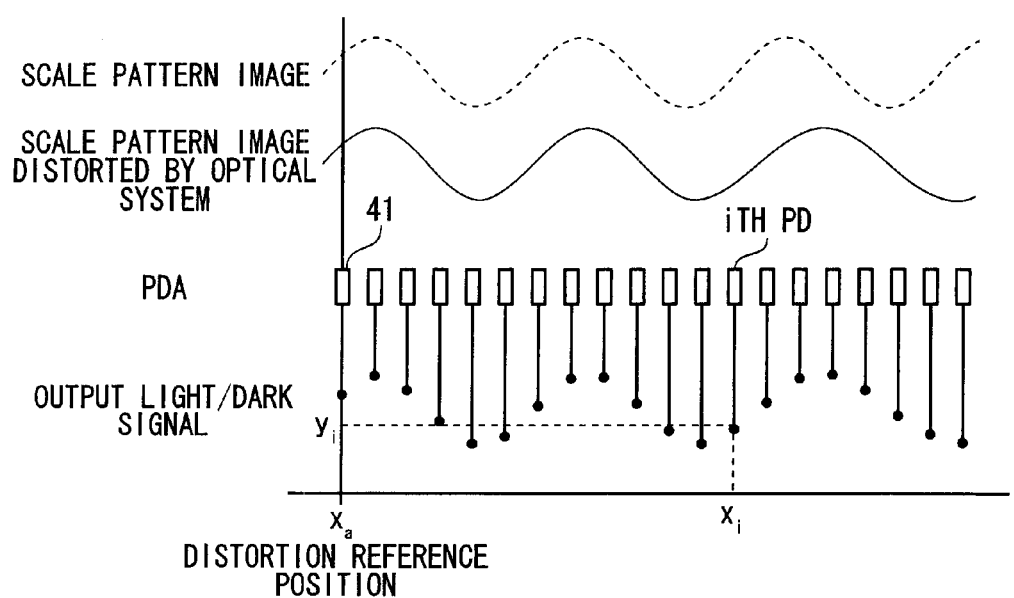
FIG. 5 is a view for description of a relationship of a scale pattern image, a position of PDA, an output light/dark signal and distortion of an optical system in the photoelectric encoder.

In the above-configured photoelectric encoder, an output light/dark signal of the PDA 14 which is configured as shown in FIG. 4 is reproduced in a manner shown in FIG. 5. That is, if a scale pattern image of the actual INC pattern 31 of the scale 12 is distorted by the optical system, a distorted scale pattern image is produced. A corresponding output light/dark signal is expressed as numerical data, that is, positions $x_i$ of the respective PDs 41 and their outputs $y_i$.

Figure 6:
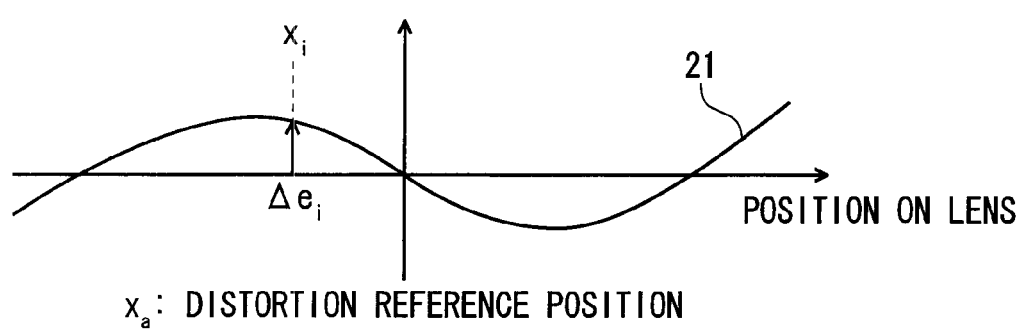
FIG. 6 is a view for description of a distortion table used in the photoelectric encoder.

Since as described above the output light/dark signal contains distortion caused by the optical system, the detection accuracy of the photoelectric encoder is lowered if a position of the scale 12 is detected on the basis of such an output light/dark signal. Therefore, a distortion table 21 as shown in FIG. 6 in which the position of each PD 41 is represented by $x_i$ and the distortion information at that position is represented by $\Delta e_i$ is generated from distortion caused by the optical system. The distortion table is calculated in advance on the basis of distortion information that is obtained by a distortion simulation using design values of the optical system.

In this distortion table 21, for example, the distortion information $\Delta e_i$ indicates to what extent the position $x_i$ of each PD 41 of the PDA 14 should be deviated virtually with the use of an arbitrarily set distortion reference position $x_a$. The distortion reference position $x_a$ may be a position where the distortion of scale pattern detected by the PDA 14 is equal to 0, and is probably around the position corresponding to the center of the lens 13.

Figure 7:
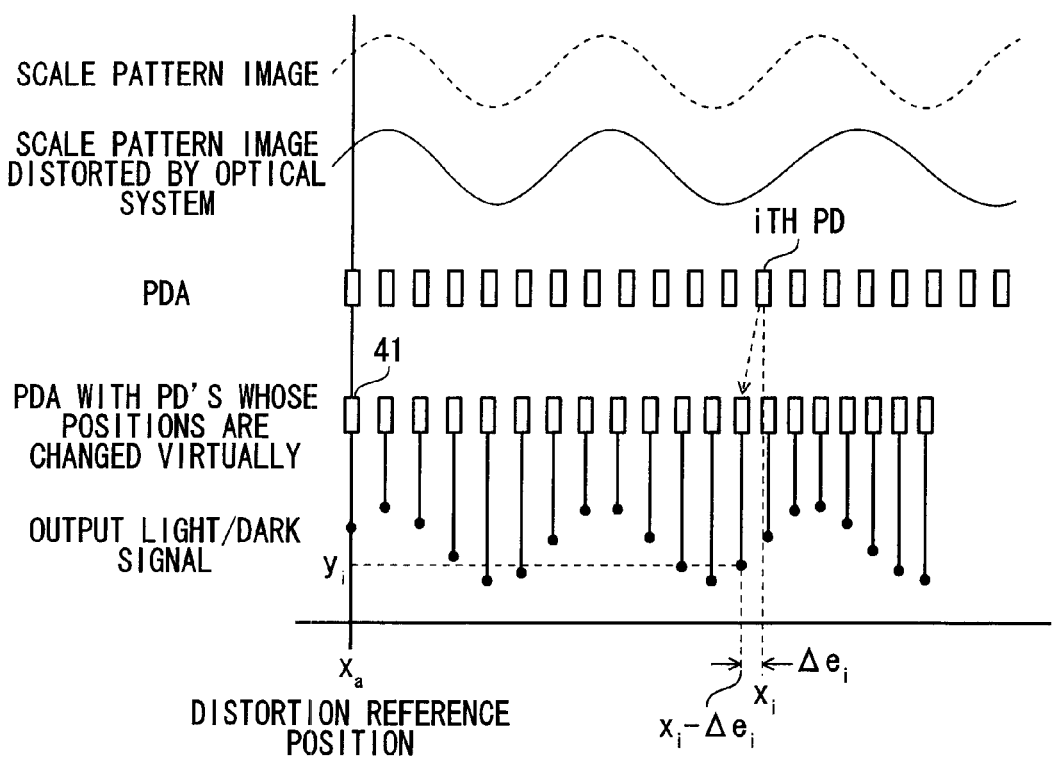
FIG. 7 is a view for description of a distortion correction in a distortion compensation circuit in the photoelectric encoder.

The distortion compensation circuit 22 corrects a light/dark signal by changing the positions of the respective PDs 41 of the PDA 14 virtually on the basis of the distortion table 21 and the pieces of position information of the respective PDs 41 in, for example, a manner shown in FIG. 7. That is, it is considered virtually that the position $x_i$ of the ith PD 41, for example, of the PDA 14 has been shifted by $\Delta e_i$ to a position $x_i - \Delta e_i$ on the basis of the distortion table 21.

The distortion compensation circuit 22 outputs the corrected light/dark signal in which $y_i$ represents the output of the ith PD 41 whose position has been changed to $x_i - \Delta e_i$ virtually. The position analyzing circuit 23 analyzes a position of the scale 12 on the basis of the output light/dark signal as corrected by the distortion compensation circuit 22 in the above-described manner.

As described above, in the above-configured photoelectric encoder according to the first embodiment, distortion can be eliminated from an output light/dark signal of the PDA 14 using the distortion table 21 which was prepared in advance on the basis of known pieces of distortion information $\Delta e_i$ of the optical system. As a result, distortion can be eliminated from a scale pattern image at a low cost and the accuracy of output position information (position signal) can thereby be increased. The displacement detecting program may be executed by a processor (not shown) of the photoelectric encoder 1. The displacement detection program may be stored in a memory which is not shown in the figures.

Embodiment 2

Figure 8:
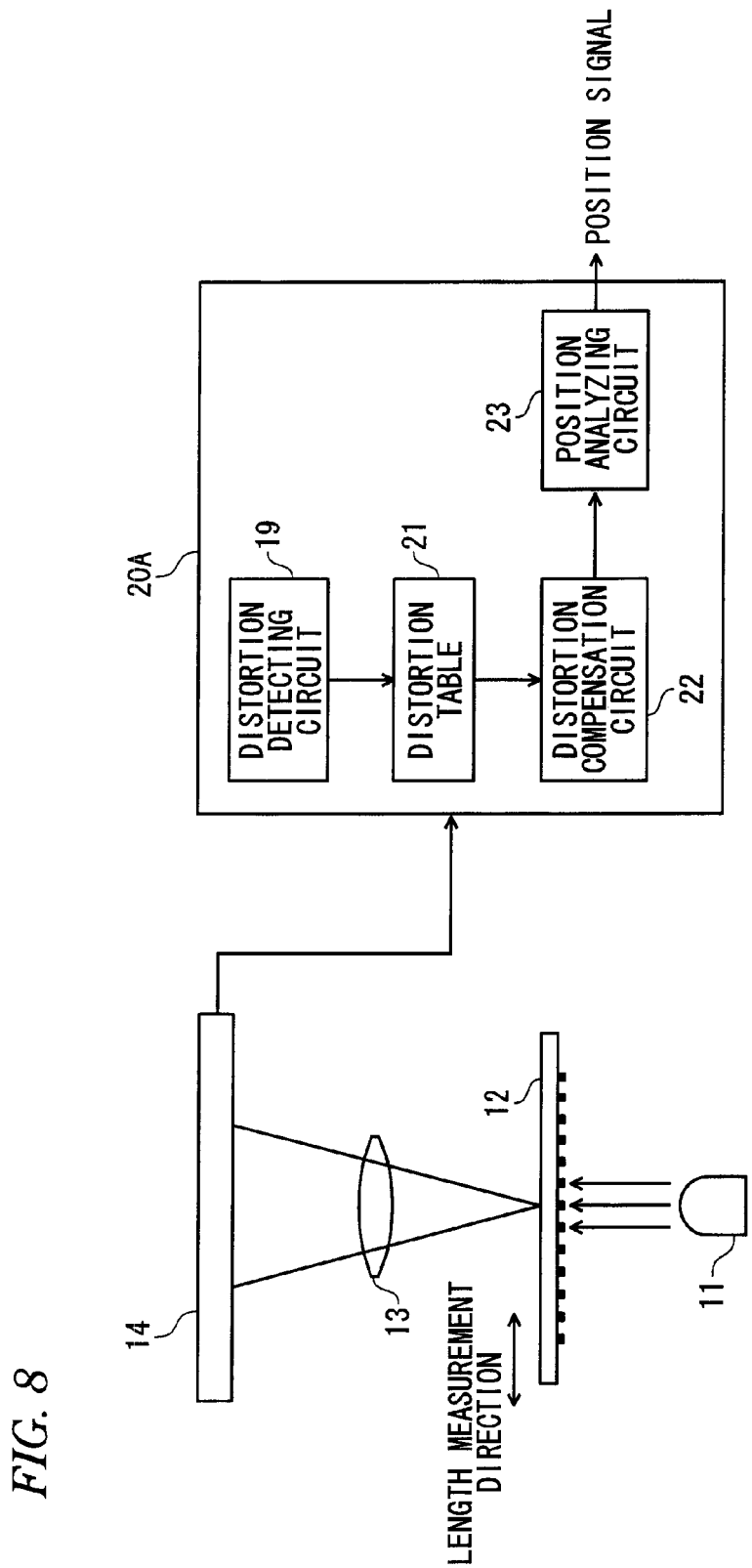
FIG. 8 is an outline view showing the overall configuration of a photoelectric encoder which is a displacement detecting device according to a second embodiment of the invention.

FIG. 8 is an outline view showing the overall configuration of a photoelectric encoder which is a displacement detecting device according to a second embodiment of the invention. As shown in FIG. 8, the photoelectric encoder according to the second embodiment is different from that according to the first embodiment in that a signal processing circuit 20A incorporates a distortion detecting circuit 19 which generates a distortion table 21.

In the first embodiment, the distortion table 21 is used which was calculated in advance on the basis of pieces of distortion information $\Delta e_i$ that were obtained from design values of the optical system. On the other hand, in the photoelectric encoder according to the second embodiment, a distortion correction is performed using a distortion table 21 that is generated by the distortion detecting circuit 19 during a measurement operation, for example.

Figure 9:
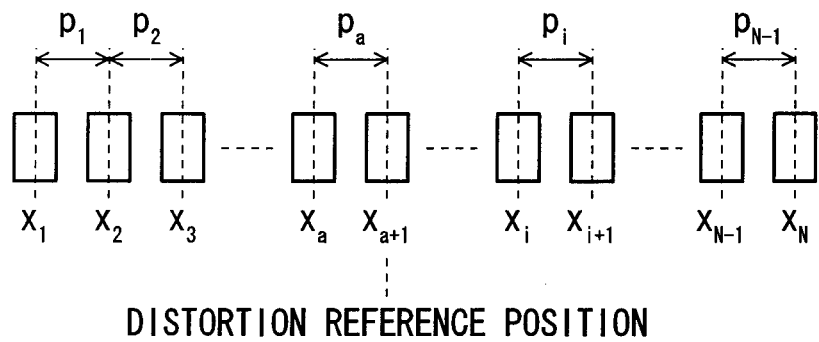
FIG. 9 is a schematic diagram showing pitch deviations of scale patterns for description of a distortion correction method used in the photoelectric encoder.

As mentioned above, for example, the INC pattern 31 of the scale 12 is formed at the arrangement pitch p which is a design scale pitch. As shown in FIG. 9, virtual positions of the respective PDs 41 of the PDA 14 are represented by $x_n$ (n=1, 2, . . . , N) and the arrangement pitch between PDs 41 located at virtual positions $x_i$ and $x_{i+1}$ is represented by $p_i$. In this case, virtual arrangement pitches corresponding to an image of the INC pattern 31 are represented by $p_1, p_2, \ldots, p_{N-1}$.

The pieces of position information of the respective PDs 41 of the PDA 14 are known in advance from design values. Therefore, the distortion detecting circuit 19 detects, from an output light/dark signal of the PDA 14 which corresponds to an image of the INC pattern 31, virtual pitch deviations $\Delta p_k$ between adjoining PDs 41 which correspond to the image of the INC pattern 31 which contains distortion caused by the optical system.

The distortion detecting circuit 19 obtains each piece of distortion information $\Delta e_i$ by adding up virtual pitch deviations $\Delta p_k$ and thereby generates a distortion table 21. For example, assume that the arrangement pitch between PDs located at positions $x_k$ and $x_{k+1}$ is represented by $p_k$ and the distortion reference position is a position $x_{a+1}$. Then, distortion information $\Delta e_i$ can be calculated according to the following Equation (1):

[Formula 1]

$$\Delta e_i = \sum_{k=1}^{i}(p_k - p) - \sum_{k=1}^{a}(p_k - p) \quad (1)$$

The distortion compensation circuit 22 eliminates distortion from an output light/dark signal of the PDA 14 by changing the positions of the respective PDs 41 of the PDA 14 virtually using the distortion table 21 that has been generated by the distortion detecting circuit 19 on the basis of the thus-calculated pieces of distortion information $\Delta e_i$. Therefore, the second embodiment provides the same advantages as the first embodiment and, in addition, can eliminate distortion from a light/dark signal by analyzing a scale pattern image during a measurement operation, for example, and output a highly accurate position signal to be fed back to the measurement. The photoelectric encoder according to the second embodiment can thus accommodate scale pattern images having different distortion patterns by correcting a light/dark signal easily.

Embodiment 3

Figure 10:
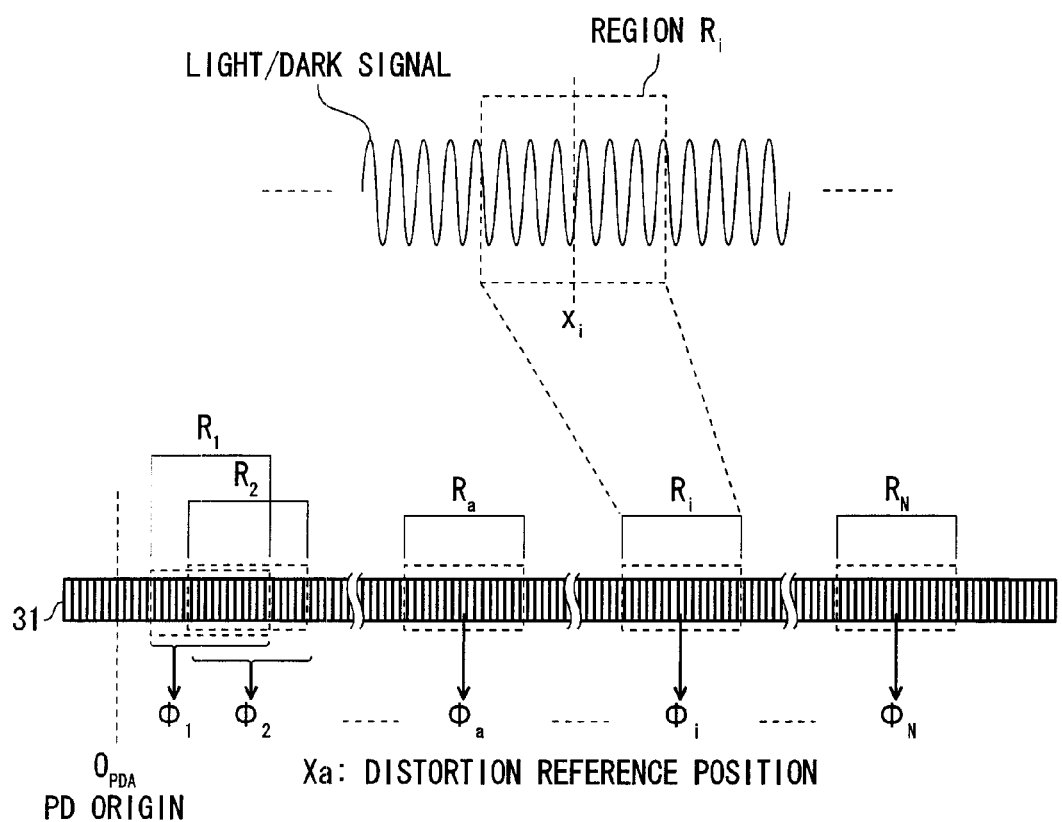
FIG. 10 is a schematic diagram showing a phase deviation of a scale pattern image for description of a distortion correction method of a photoelectric encoder which is a displacement detecting device according to a third embodiment of the invention.

FIG. 10 is a schematic diagram illustrating a phase deviation of a scale pattern image for description of a distortion correction method of a photoelectric encoder which is a displacement detecting device according to a third embodiment of the invention. The basic configuration of the photoelectric encoder according to the third embodiment is the same manner as that the photoelectric encoder according to the second embodiment (see FIG. 8).

Whereas in the second embodiment each pieces of distortion information $\Delta e_i$ is calculated by adding up pitch deviations $\Delta p_i$, in the third embodiment on the basis of a phase of a scale pattern image. As shown in FIG. 10, the distortion detecting circuit 19 extracts a partial light/dark signal corresponding to a prescribed region $R_i$ that is centered by each PD 41 located at a position $x_i$ from a light/dark signal corresponding to the INC pattern Then, the distortion detecting circuit 19 calculates a phase $\phi_i$ of the partial light/dark signal corresponding to each prescribed region $R_i$ of the INC pattern 31 with the use of a PD origin $O_{PDA}$. Then, the distortion detecting circuit 19 calculates each piece of distortion information $\Delta e_i$ by calculating a difference between each calculated phase $\phi_i$ and a phase $\phi_a$ of a partial light/dark signal corresponding to a prescribed region $R_a$ that is centered by a distortion reference position $x_a$ according to the following Equation (2), and generates a distortion table 21 as described above.

[Formula 2]

$$\Delta e_i = \phi_i - \phi_a \quad (2)$$

The photoelectric encoder according to the third embodiment is advantageous over that according to the second embodiment in that errors contained in deviations $\Delta p_i$ are not accumulated because as described above the photoelectric encoder according to the third embodiment corrects a light/dark signal by calculating each piece of distortion information $\Delta e_i$ on the basis of a phase $\phi_i$ of a partial light/dark signal corresponding to each prescribed region $R_i$ and generates a distortion table 21 on the basis of the calculated pieces of distortion information $\Delta e_i$. This makes it possible to obtain position information with even higher accuracy.

Embodiment 4

Figure 11:
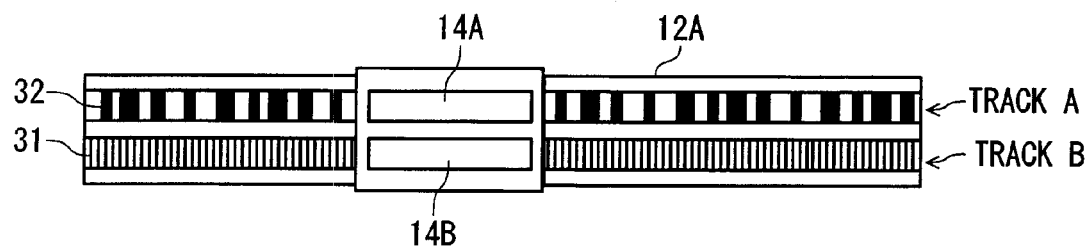
FIG. 11 is a plan view showing how a scale and photodiode arrays of a photoelectric encoder which is a displacement detecting device according to a fourth embodiment of the invention are configured.

FIG. 11 is a plan view showing how a scale and photodiode arrays of a photoelectric encoder which is a displacement detecting device according to a fourth embodiment of the invention are configured. As shown in FIG. 11, the photoelectric encoder according to the fourth embodiment is different in configuration from the photoelectric encoder according to the third embodiment in that the scale 12A of the former has plural (N) tracks.

For example, the scale 12A is provided with a track A having an absolute pattern (hereinafter referred to as an ABS pattern) 32 and a track B having an INC pattern 31. The photoelectric encoder includes optical systems and PDAs 14A and 14B which correspond to the respective tracks A and B.

Figure 12:
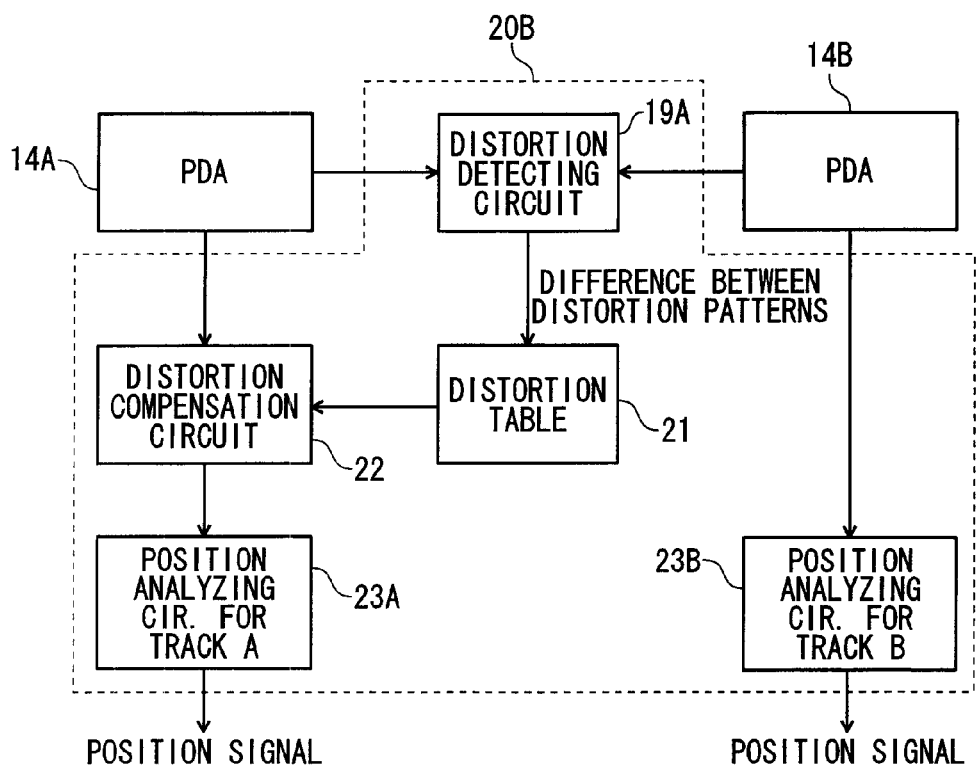
FIG. 12 is a block diagram showing an internal configuration of a signal processing circuit of the photoelectric encoder.

As shown in FIG. 12, a signal processing circuit 20B includes a distortion detecting circuit 19A, a distortion compensation circuit 22, and position analyzing circuits 23A and 23B for the respective tracks A and B. The distortion detecting circuit 19A calculates two sets of pieces of distortion information $\Delta e_i$ on the basis of light/dark signals supplied from the respective PDAs 14A and 14B and generates a distortion table 21 by calculating differences between the two sets of pieces of distortion information $\Delta e_i$. The distortion compensation circuit 22 eliminates distortion from the light/dark signal corresponding to the track A, for example.

In the above-configured photoelectric encoder, it is desirable that pieces of position information obtained from the tracks A and B have the same value. However, if the optical systems for detecting scale pattern images of the tracks A and B cause different distortion, errors (inter-track errors) occur between pieces of position information that are generated as corresponding to the respective tracks A and B due to the difference between the distortion and disable correct position detection.

Figure 13A:
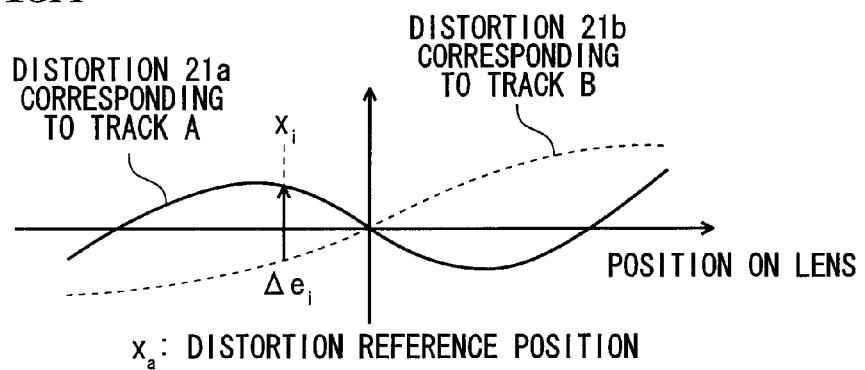
FIGS. 13A and 13B are views a distortion table and a distortion correction method used in the photoelectric encoder.

As shown in FIG. 13A, the distortion detecting circuit 19A calculates distortion information $\Delta e_i$ indicating distortion 21a or 21b corresponding to the track A or B at each PD 41 of each of the PDAs 14A and 14B located at a position $x_i$ on the basis of distortion caused by the respective optical system. In this embodiment, the track B is used as a reference track and the distortion corresponding to the track A is modified so as to become equal to the distortion corresponding to the track B.

Figure 13B:
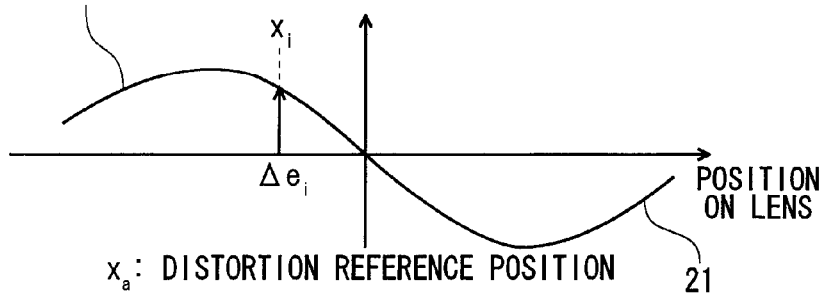

Two sets of pieces of distortion information $\Delta e_i$ corresponding to the respective tracks A and B are calculated, differences between them are calculated, and a distortion table 21 as shown in FIG. 13B is thereby generated. The distortion compensation circuit 22 corrects an output light/ dark signal of the PDA 14A by referring to the distortion table 21. That is, the distortion compensation circuit 22 changes the position of, for example, an ith PD 41 virtually from $x_i$ to $x_i - \Delta e_i$ and employs an output $y_i$ of the position-changed PD 41 in a corrected light/dark signal.

Since the distortion corresponding to the track A, for example, is corrected so as to become equal to the distortion corresponding to the track B, inter-track errors that occur in pieces of position information obtained through the tracks A and B due to distortion patterns caused by the optical systems, respectively, can be suppressed. This makes it possible to obtain position information with high accuracy even in a photoelectric encoder having plural tracks.

What is claimed is:

1. A displacement detecting device comprising:
    a scale having a scale pattern with a certain arrangement pitch;
    an optical system configured to form an optical image of the scale pattern;
    a light-receiving element array having a plurality of light-receiving elements which is configured so as to be movable relative to the scale and which is configured to detect the image of the scale pattern and to output a light/dark signal obtained from the scale pattern image;
    a distortion compensation circuit configured to correct the light/dark signal which is output from the light-receiving element array by eliminating distortion caused by the optical system by changing positions of the respective light-receiving elements virtually on the basis of pieces of position information of the respective light-receiving elements and a distortion table obtained from distortion information of the optical system; and
    a position analyzing circuit configured to analyze a position of the scale using the corrected light/dark signal.

2. The displacement detecting device according to claim 1, wherein the distortion table is calculated in advance on the basis of distortion information that is obtained by a distortion simulation using design values of the optical system.

3. The displacement detecting device according to claim 1, further comprising:
    a distortion detecting circuit configured to detect deviations $\Delta p_k$ of virtual intervals between light-receiving elements that correspond to the detected scale pattern image from intervals between the light-receiving elements on the basis of the pieces of position information of the respective light-receiving elements and the light/dark signal which is output from the light-receiving element array, and to generate a distortion table on the basis of pieces of distortion information $\Delta e_i$ each of which is obtained by adding up the detected deviations $\Delta p_k$.

4. The displacement detecting device according to claim 1, further comprising:
    a distortion detecting circuit configured to extract a partial light/dark signal corresponding to a prescribed region $R_i$ centered by each PD located at a position $x_i$ and calculate a phase $\phi_i$ of the partial light/dark signal corresponding to each prescribed region $R_i$ with the use of a light-receiving element origin $O_{PDA}$ on the basis of the pieces of position information of the respective light-receiving elements and the light/dark signal which is output from the light-receiving element array, to calculate each piece of distortion information $\Delta e_i$ by calculating a difference between each calculated phase $\phi_i$ and a phase $\phi_a$ of a partial light/dark signal corresponding to a prescribed region $R_a$ centered by a distortion-less light-receiving element located at a distortion reference position $x_a$, and to generate a distortion table on the basis of the calculated pieces of distortion information $\Delta e_i$.

5. The displacement detecting device according to claim 1, wherein
    the scale has scale patterns formed on a plurality of tracks;
    the optical system and the light-receiving element array have a plurality of optical systems and a plurality of light-receiving elements corresponding to the plurality of tracks; and
    the distortion compensation circuit is configured to correct light/dark signals corresponding to the plurality of tracks using a distortion table in which pieces of distortion information of optical systems corresponding to the other tracks are modified so as to become equal to distortion information of an optical system corresponding to one of the plurality of tracks.

6. The displacement detecting device according to claim 5, wherein the distortion compensation circuit is configured to correct the light/dark signals using a distortion table which is generated on the basis of differences between the distortion of the optical system corresponding to the one track and the pieces of distortion information of the optical systems corresponding to the other tracks.

7. The displacement detecting device according to claim 1, further comprising:
    a storage unit configured to store the distortion table.

8. A displacement detecting method of a displacement detecting device having a scale having a scale pattern with a certain arrangement pitch, an optical system configured to form an optical image of the scale pattern, a light-receiving element array having a plurality of light-receiving elements which is configured so as to be movable relative to the scale and which is configured to detect the image of the scale pattern and to output a light/dark signal obtained from the scale pattern image, a distortion compensation circuit configured to correct the light/dark signal which is output from the light-receiving element array, and a position analyzing circuit configured to analyze a position of the scale on the basis of the corrected light/dark signal, the method comprising:
    acquiring a light/dark signal by detecting an image of the scale pattern;
    correcting the acquired light/dark signal by eliminating distortion caused by the optical system by changing positions of the respective light-receiving elements virtually on the basis of pieces of position information of the respective light-receiving elements and a distortion table obtained from distortion information of the optical system; and
    analyzing a position of the scale on the basis of the corrected light/dark signal.

9. A non-transitory computer-readable medium storing a program that causes a computer to execute displacement detection, the computer controlling a displacement detecting device having a scale having a scale pattern with a certain arrangement pitch, an optical system configured to form an optical image of the scale pattern, a light-receiving element array having a plurality of light-receiving elements which is configured so as to be movable relative to the scale and which is configured to detect the image of the scale pattern and to output a light/dark signal obtained from the scale pattern image, a distortion compensation circuit configured to correct the light/dark signal which is output from the light-receiving element array, and a position analyzing configured to analyze a position of the scale on the basis of the corrected light/dark signal, the displacement detection comprising:

acquiring a light/dark signal by detecting an image of the scale pattern;

correcting the acquired light/dark signal by eliminating distortion caused by the optical system by changing positions of the respective light-receiving elements virtually on the basis of pieces of position information of the respective light-receiving elements and a distortion table obtained from distortion information of the optical system; and analyzing a position of the scale on the basis of the corrected light/dark signal.

* * * * *